June 17, 1941.　　　A. E. WARBY　　　2,245,947
BELT FASTENER
Filed July 8, 1940

INVENTOR
ALBERT E. WARBY
By Wilehauster & Groff
Attys

Patented June 17, 1941

2,245,947

UNITED STATES PATENT OFFICE 2,245,947

BELT FASTENER

Albert Edward Warby, Chadwell Heath, England

Application July 8, 1940, Serial No. 344,442
In Great Britain April 28, 1939

3 Claims. (Cl. 24—39)

This invention relates to transmission or carrier belt fasteners of the kind employing a bifurcated wire element with inturned prongs adapted to be clenched on to the belt end to form a projecting loop. In use each of the pair of belt ends to be joined together is provided with a row of fasteners, the two rows being interlaced and then attached together by means of a hinge pin passed through the loops of the fasteners.

The main object of the present invention is to provide a fastener which will bed itself snugly and squarely in the belt, that is to say one in which, during the application of the pressure plates of the clenching apparatus, the tendency of one leg to roll on the plate and twist relatively to the other leg with sideways distortion is minimised, and as a result general strengthening of the mounted fastener is secured. A further object is to provide a cross section for the wire of the fastener which, while securing the foregoing object, will give great strength particularly at the inturned prongs; the prongs under strain are liable to straighten and consequently pull out of the belt, and the section applied to the wire of the fastener according to the invention not only prevents this, but attains the main object of the invention.

In my prior British specification No. 476,976 there is described and shown a fastener in which the wire has an oval or elliptic section with the long axis of the oval or ellipse lying in the plane of the fastener. In the invention there described, the narrow rounded edge of a wire with such a section assisted materially in the fastener embedding itself into the belt material, and further the arrangement described gave great strength.

The present invention preserves the ease of bedding feature by adopting a convexity on the inside edge of the fastener, but on the opposite edge, i. e. the outside or periphery of the fastener, a flat face is employed to ensure that the material will not develop a sideways or skew twist during clenching.

According to the invention, the bifurcated wire element of a belt fastener is of a cross section having a flat side corresponding to the flat outside peripheral edge of the element and a convex side opposite to said flat side and corresponding to the inside edge of the element, the sides completing the cross section being lines of any suitable shape. In an embodiment, by way of example, the section includes three rectilinear lines (the middle one of which corresponds to the said flat outside edge) and an outwardly curved line completing the sectional figure and corresponding with the inside edge of the element. Preferably, for greater strength, the length of the figure measured in the general plane of the element exceeds the width of the figure measured in a direction normal to that plane.

An example of the invention is shown in the accompanying drawing wherein.

Figure 1:
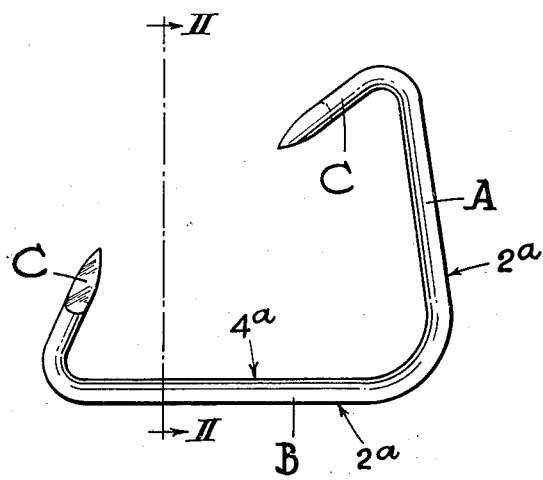
Figure 1 is a front elevation.
Figure 2:
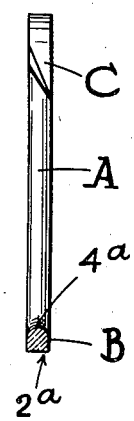
Figure 2 is a side sectional elevation on line II—II of Figure 1.

Referring to the drawing, the wire element is bifurcated to form the two legs A, B, each having an inturned prong C, as is known with this kind of belt fastener. The leg A is shorter than the leg B, so that the prongs miss one another when clenched.

Figure 3:
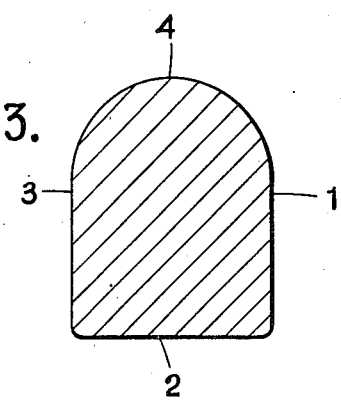
Figure 3 is an enlargement of the cross-section of the wire seen at the foot of Figure 2.

The section of the wire is seen more clearly in Figure 3 and comprises the three rectilinear lines 1, 2 and 3 of which the middle one (2) corresponds to the flat outer peripheral edge 2a of the element. The sectional figure is completed by the convex line 4 which corresponds to the inside edge 4a of the element. The distance between the line 2 and the highest point of the convexity 4 is preferably greater than the width of the figure between lines 1 and 3. In other words, the thickness of the wire in the plane of the element is greater than the thickness across that plane. The selection of a cross-sectional figure having proportions so related is preferable in order to secure utmost strength (which, in fact, is the basis of the invention in the previous specification aforesaid), but it is to be understood that the present invention is not restricted to such a proportional feature, the essence being the exterior flat 2a and interior convexity 4a.

The invention may be carried out by having the line 4 partly flat in the center merging into rounded or arcuate corners where it joins the side lines 1 and 3. Such a shape is included in the description "convex" for the purposes of the invention. The sides 1 and 3 need not be parallel, as inclined lines or curves may be employed so long as the flat outer line, and convex inner line is maintained.

I claim:

1. A deformable fastener for locking together belt ends adapted for application to said belt ends in undeformed non-locking configuration in contact therewith and for deformation by pressure applied to said fastener normally to said belt ends while said fastener is so in contact therewith for deforming said fastener into configuration for lockingly engaging said belt ends, consisting of a wire element having throughout its length a cross-section having an axially symmetrical outwardly convex curvilinear peripheral portion and a straight edge opposite said curvilinear portion and substantially perpendicular to the axis thereof, said wire element consisting of two adjoining median coplanar portions which meet at an angle and two terminal portions which respectively meet at an angle, the outer ends of said median portions and are directed reentrantly toward each other in the plane of said median portions, said fastener being formed with said straight edge substantially perpendicular to the plane of said fastener and forming an outward peripheral face thereof on which said fastener is adapted to stand, whereby said fastener deforms entirely within its said plane when pressure is applied normally to said outward peripheral face to deform said fastener into locking engagement with said belt ends without skew twist.

2. A fastener according to claim 1, said element having a cross-section consisting of a quadrilateral having one outwardly convex curvilinear side and three linear sides which constitute sides of a rectangle.

3. A fastener according to claim 1, said element having a cross-section whose diameter is substantially greater in the direction perpendicular to said straight edge and passing through said curvilinear portion and lying in the plane of said fastener than is the diameter normal to said first named diameter.

ALBERT EDWARD WARBY.